US012784380B2

(12) United States Patent
Jaeger et al.

(10) Patent No.: US 12,784,380 B2
(45) Date of Patent: Nov. 3, 2026

(54) RELATIVE MOVEMENT TRACKING WITH AUGMENTED REALITY

(71) Applicant: Hoffmann-La Roche Inc., Little Falls, NJ (US)

(72) Inventors: Ralf Josef Jaeger, Basel (CH); Xing Chen, Basel (CH)

(73) Assignee: Hoffmann-La Roche Inc., Little Falls, NJ (US)

( * ) Notice: Subject to any disclaimer, the term of this patent is extended or adjusted under 35 U.S.C. 154(b) by 148 days.

(21) Appl. No.: 18/702,541

(22) PCT Filed: Oct. 20, 2022

(86) PCT No.: PCT/EP2022/079195
§ 371 (c)(1),
(2) Date: Apr. 18, 2024

(87) PCT Pub. No.: WO2023/067055
PCT Pub. Date: Apr. 27, 2023

(65) Prior Publication Data

US 2024/0412386 A1 Dec. 12, 2024

(30) Foreign Application Priority Data

Oct. 21, 2021 (EP) .................................... 21204019

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/011* (2013.01); *G06T 7/248* (2017.01); *G06T 7/251* (2017.01);
(Continued)

(58) Field of Classification Search
None
See application file for complete search history.

(56) References Cited

U.S. PATENT DOCUMENTS

2019/0080516 A1 3/2019 Petrovskaya et al.
2021/0267494 A1* 9/2021 Wang .................. A61B 5/0075
(Continued)

OTHER PUBLICATIONS

Bauer, Armelle et al., "Anatomical augmented reality with 3D commodity tracking and image-space alignment," Computers and Graphics, vol. 69, Nov. 2017, pp. 140-153.
(Continued)

*Primary Examiner* — Jwalant Amin
(74) *Attorney, Agent, or Firm* — IP Spring

(57) ABSTRACT

Systems and computer-implemented methods for tracking movement of a subject comprise and perform the steps of: Obtaining depth image data of a subject's body during a predefined time period and tracking locations of a plurality of anatomical landmarks of the body based on the depth image data. In addition, a location of a predefined point is tracked in an environment, in which the subject is moving. The location of the one or more of the plurality of anatomical landmarks is adjusted relative to the location of the predefined point to obtain adjusted locations. A movement of the subject's body is determined based on the adjusted locations during the predefined time period.

14 Claims, 11 Drawing Sheets

(51) Int. Cl.
*G06T 7/246* (2017.01)
*G06T 7/73* (2017.01)
*G06T 19/20* (2011.01)

(52) U.S. Cl.
CPC ................ *G06T 7/75* (2017.01); *G06T 19/20* (2013.01); *G06T 2207/10028* (2013.01); *G06T 2207/20016* (2013.01); *G06T 2207/30196* (2013.01)

(56) References Cited

U.S. PATENT DOCUMENTS

2022/0211444 A1* 7/2022 Dassonville .......... A61F 2/4059
2023/0052613 A1* 2/2023 Kamiyama .......... G06V 40/103

OTHER PUBLICATIONS

Liu, Pin-Ling et al., "Simple benchmarking method for determining the accuracy of depth cameras in body landmark location estimation: Static upright posture as a measurement example," PLOS ONE, vol. 16, No. 7, Jul. 21, 2021, pp. 1-16.
Bauer, Armelle et al., "Anatomical mirroring: real-time user specific anatomy in motion using a commodity depth camera," Proceedings of the 9th International Conference on Motion in Games, MIG '16, Jan. 1, 2016, pp. 113-122.
EPO, International Search Report for International Patent Application No. PCT/EP2022/079195, Feb. 3, 2023, 4 pages.
EPO, Written Opinion for International Patent Application No. PCT/EP2022/079195, Feb. 3, 2023, 5 pages.

* cited by examiner

RELATIVE MOVEMENT TRACKING WITH AUGMENTED REALITY

CROSS-REFERENCE TO RELATED APPLICATIONS

This application is a U.S. National Stage filing under 35 U.S.C. § 371 of International Patent Application No. PCT/EP2022/079195, filed Oct. 20, 2022, which in turn claims priority under PCT Article 8 and/or 35 U.S.C. § 119 (a) to and the benefit of European Patent Application No. EP21204019.0, filed on Oct. 21, 2021. The disclosures of European Patent Application No. EP21204019.0 and International Patent Application No. PCT/EP2022/079195 are hereby incorporated by reference herein in their entirety for all purposes.

TECHNICAL FIELD

The present application generally relates to the field of motion tracking an analysis of a subject or object.

BACKGROUND

Recent progress in image processing allows to track the movement of a subject, in particular a human body or parts thereof, over time by means of a camera sensor and a computing device.

For instance, Microsoft's Kinect™ sensor includes an RGB video camera, microphones and an infrared sensor and allows to obtain depth images. It further allows to perform gesture recognition, speech recognition, and body skeletal detection. It is commonly used to mediate an interaction between a human and a computing device, for instance in context of gaming, and for unobtrusive movement analysis of a subject and in particular of a human body.

The evolution of sensor technology has also enabled the healthcare community to use digital tools to generate real-world data and real-world evidence. Accurate assessments of spatial and temporal movement characteristics have important applications, e.g. in the field of physiotherapy, fitness and health, but not limited thereto. Applications include to track the extent of a subject's movement, determine an accuracy at which the subject performs certain predefined movements, and the assessment of how the movement of a subject repeatedly performing the same movement evolves over time. The analysis can be tailored to specific subject, e.g. a person. Such personalized analysis can e.g. adapt to properties of the body of a specific person and movement capabilities of the tracked person.

In the field of motion analysis for fitness and health, it is common to use machine learning (ML) technology to measure and analyze movements of a person in a fast an accurate manner with a 2-dimensional camera-based system. However, there are several challenges and problems with this approach: Many repetitions of a specific movement are required to create and train a ML model accurate and personalized tracking of a person's body is possible.

Conventional motion analysis for fitness and health requires significant computational effort for analyzing input data to match threshold parameters, which can be time consuming and may not be easily done in real-time with resources available on the mobile computing device and therefore can require cloud computing services.

Moreover, conventional camera systems used for implementing the tracking require good, i.e., in terms of visibility, light conditions and sufficient contrast to distinguish subject, clothes worn by the subject, and environment.

These and other problems of conventional technologies in the field of motion tracking an analysis of a subject are solved by technologies disclosed herein and summarized in the following.

SUMMARY

A simplified summary of some embodiments of the disclosure are provided in the following to give a basic understanding of these embodiments and their advantages. Further embodiments and technical details are given in the detailed description presented below.

According to an embodiment, a computer-implemented method for movement tracking of a subject, the method comprising the steps of: obtaining depth image data of a subject's body during a predefined time period; tracking locations of a plurality of anatomical landmarks of the body based on the depth image data; tracking a location of a predefined point in an environment, in which the subject is moving; adjusting the location of one or more of the plurality of anatomical landmarks relative to the location of the predefined point to obtain adjusted locations; determining a movement of the subject's body based on the adjusted locations during the predefined time period. This, and in particular the step of adjusting the position of the tracked locations, has the advantage that a more precise tracking of movement of anatomical landmarks relative to each other is possible.

In some embodiments, the environment is a real environment, wherein the predefined point is an anchor point of a virtual environment superimposed on the real environment, and wherein the adjusted locations correspond to a position of the subject's body in the virtual environment.

In some embodiments, the predefined point corresponds to one of the anatomical landmarks or a tag attached to the subject's body and suitable to be recognized in the depth image data, so that locations in the virtual environment follow a motion of the location of the one of the anatomical landmarks. This has the advantage that possibly unintended or unavoidable physical movement or jitter of the subject does not lead or impact a movement of the subject tracked in the virtual space, since the virtual space i.e. an augmented reality space for therapeutic purposes, is locked to the subject or a subject who does the therapeutic exercise. A further advantage results as the movement determination of the subject in the virtual space is robust against movement of the depth image camera, i.e., the results of the movement determination of the subject are not affected by movement of the depth camera during recording the depth image data on which the determination of the movement of the subject is based. The aspect is especially useful if the depth sensor is integrated in a mobile device that may move itself. In other words, movement of the mobile device may be distinguished from movement of the subject from which the depth image data is recorded.

In some embodiments, the predefined point is a fixed location in the real environment, the fixed location being preferably a geolocation or a position of a tag fixed to the real environment and suitable to be recognized in the depth image data. As advantage of this further aspect is also that the results of the determination of movement of the subject are not affected by movement of the depth camera during recording of the depth image data.

In some embodiments, the virtual environment is an augmented reality environment.

In some embodiments, such augmented reality environment includes a virtual object that the subject can interact with, wherein, in the augmented reality environment and based on the adjusted locations and a location of the virtual object, it is determined whether the subject interacts with the virtual object. If an interaction is determined an indication of the interaction is signaled to the subject.

In some embodiments, the augmented reality environment includes a virtual guiding object. In the augmented reality environment and based on the adjusted locations and a location of the virtual guiding object, a virtual distance between a subject's body part corresponding to one or more of the adjusted locations and the virtual guiding object is determined and in response to the determination, an indication of the virtual distance to the subject is signaled.

In some embodiment, the augmented reality environment includes a virtual target movement path. During the predefined time period and based on the adjusted locations and locations of the target movement path in the augmented reality environment, a deviation of the subject's body part corresponding to one or more of the adjusted locations and the target movement path is determined and, in response to the determination, an indication of the deviation is signaled to the subject, for example in a visual or audible manner.

In some embodiments, a combined image of the real environment and the superimposed virtual environment is rendered in real-time and said combined image is output for display.

The technology disclosed herein can also be embodied in a computing device comprising a motion sensor, a camera, and a processor communicatively coupled to a display, wherein the processor is adapted to perform the steps of a method for movement tracking of a subject as outlined hereinbefore.

In some embodiments, the depth image data is obtained using a LIDAR sensor, and the LiDAR sensor. This aspect has the advantage that tracking locations of a plurality of anatomical landmarks works well also under poor lightning and contrast conditions.

In some embodiments, the computing device is a mobile computing device.

The technology disclosed herein can also be embodied in a computer-readable medium comprises instructions which, when executed by a computer, cause the computer to carry out the method for movement tracking of a subject according to the methods specified hereinabove.

The present technology provides one or more the following advantages:

An advantage is that no ML model training is required upfront. Instead of tedious training every time for each therapeutic exercise a new ML model, an artificial environment is created as described below as a therapeutic virtual environment (TVE) or virtual object.

Virtual objects are shown as part of the TVE on a screen. The virtual objects are useful for establishing the tracked person's orientation, e.g., to enable the person improving the precision of an exercise or to serve as a motivation for the person. Unlike conventional technology, adjustments of a size and distance of such objects in a virtual space shown on the screen can be more easily adjusted, so that the display of the object as perceived by the person is more realistic. More generally, approaches that do not link an exercise/training object/device to the position of the person performing the exercise, suffers from imprecision when the person begins to move away from the initial position of the person when starting the exercise. Such imprecision can deteriorate the user's perception of the virtual reality environment as a real environment, and further can deteriorate the accuracy with which the movement of the person and distances of the person's body or parts thereof to the objects in the virtual reality space show on the screen are determined.

Increasingly strenuous exercises, i.e. exercise is more challenging for the person to carry out, can be easily programmed into the system, e.g. a (virtual) wall which has to be touched by a patient can be gradually move further away over time depending on the person's or patient's progress or goals of the exercises.

The technology disclose herein allows indirect, i.e., object-driven visual feedback, because a person or a patient can see on a screen not only what s/he is doing but also see herself in relation to a defined endpoint, e.g., a virtual wall, which avoids providing feedback to the person by other means, e.g., signals, and instructor's voice or displayed text, which is prone to become monotonous or distracting.

The augmented reality environment (ARE) can be a therapeutic virtual environment (TVE) which minimizes effects of an inadvertent position change or cheating by a person or patients in the exercises performed because object distances are linked and dependent on each other. For example, moving closer to the virtual wall will not make it easier for the person to reach the wall, since the wall moves with the person does the virtual environment which includes the wall, is linked the person's body or a part thereof.

TVEs are once defined (sketched) and get adjusted to (and by) the patient on the fly while executing exercises based on instruction thereby defining paths and endpoints or are set up by exploiting parameters derived from the patient (physical like height, armlength etc. and/or some capability parameters associated with a disease or stage thereof.

Using a device capable of generating 3D data, e.g., LiDAR, the TVE space can be used in all dimensions rather than being significantly limited to the coronal plane with regard to the lens when using a 2D camera system. Moreover, the use of a LIDAR sensor and the three-dimensional tracking it enables, allows for tracking therapeutic exercises in the z-direction (sagittal). Conventional technology, however, tracks predominantly only movement in x-y direction (coronal). The technology disclosed herein therefore provides and supports a broader range of therapeutic exercises.

The foregoing general description and the following detailed description are exemplary and explanatory only and are not restrictive of the invention as claimed.

BRIEF DESCRIPTION OF THE DRAWINGS

The foregoing summary as well as the following detailed description of preferred embodiments are better understood when read in conjunction with the append drawings. For illustrating the invention, the drawings show exemplary details of systems, methods, and experimental data. The information shown in the drawings are exemplary and explanatory only and are not restrictive of the invention as claimed. In the drawings:

DETAILED DESCRIPTION

The present disclosure relates to methods and systems for a computer-implemented tracking and analysis of movement of a subject.

The subject can be a person, but the technology is not limited to human subjects. More generally, a subject may also be an animal. The subject may also be a moving object, such as a robot. For the sake of simplicity and illustration, the subject is referred to as "person" in the following but should not be is not limited thereto unless stated otherwise.

The methods and systems described herein are suitable to for supporting a broad range therapeutic exercises and assessing a person's performance and movement. Specifically, support is given by providing a virtual environment, which augments the real environment surrounding the person and which is thus an augmented reality environment (ARE).

Figure 1:
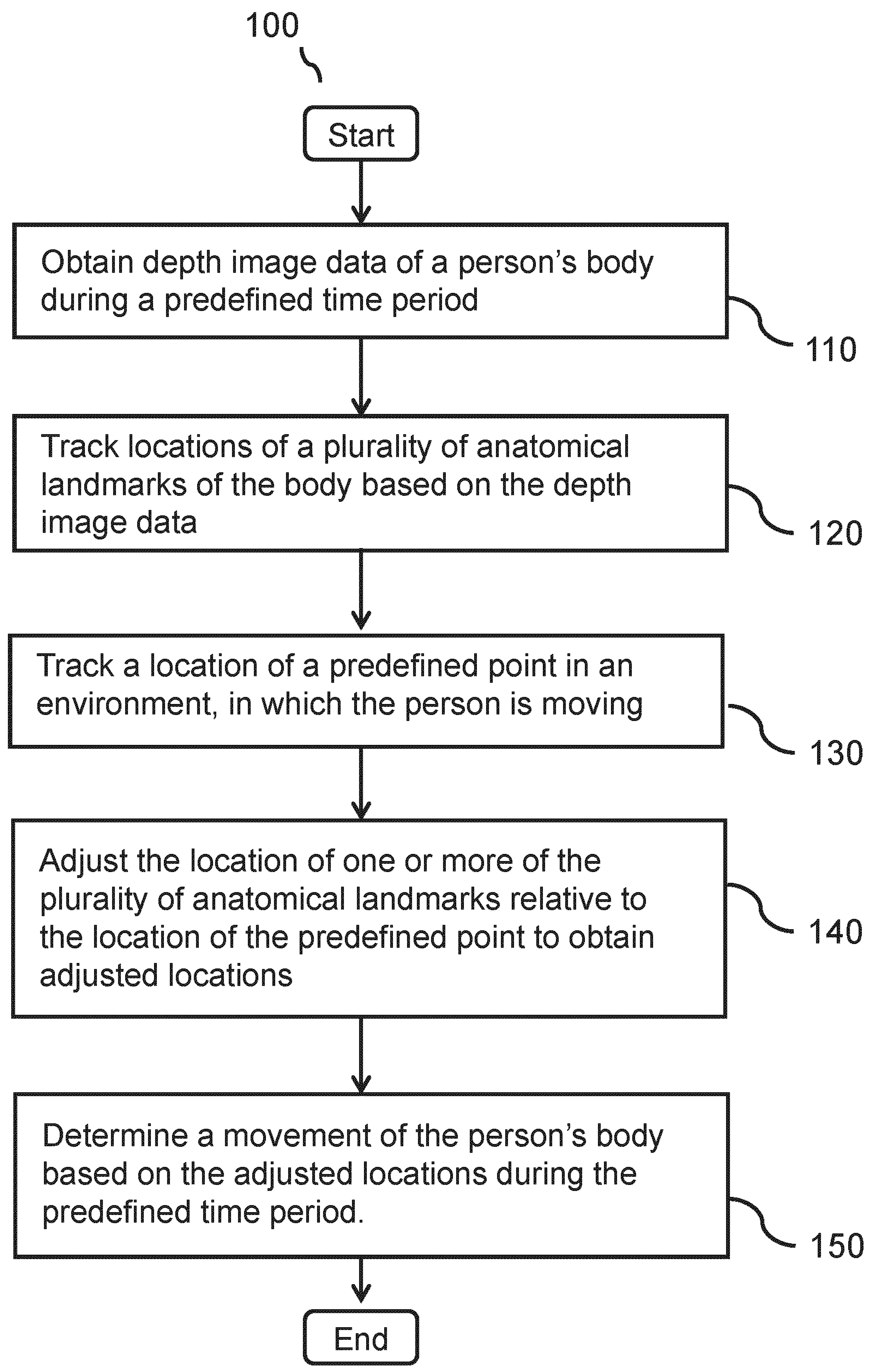
FIG. 1 shows a flowchart of a computer-implemented method for analyzing and tracking the movement of a subject.

FIG. 1 shows a method 100 for movement tracking of a subject or object. The method is implemented by a computer and using one or more sensors as described in the following. While FIG. 1 describes the method on the example of a person and the person's body for illustrative purposes, it is understood that the method is also applicable to other subjects and objects as described below.

The method 100 starts with obtaining 110 depth image data of a subject's body during a predefined time period. The depth image data is obtained, for example by conventional depth sensing cameras available in mobile devices. Alternatively, or in addition, a LIDAR sensor-based depth sensing mechanism may be employed. Depth image data includes for each pixel of an image besides color information also depth information in terms of distance from the depth sensor or camera. Depth image data is obtained in step 110 through the motion sensor from the person's body during a predefined time period. A predefined time period can be in the order of (sub-) seconds or minutes, depending on the duration of an exercise or movement. For example, such a predefined time period can correspond to the physical response time of an organism, which can be within few 100 milliseconds. The motion sensor may capture depth image data during the predefined time period, for example at a rate a rate of 30 Hz and provide the same to the processor for analysis. For LiDAR-based sensors, this rate can be higher and in the order of a few hundred Hz. Obtaining image data, providing the data to the processor and further analysis of the data as described below can occur in a pipeline or streamed manner such that results of the movement tracking and analysis can be provided in real-time or quasi real-time with slight delay.

Figure 4:
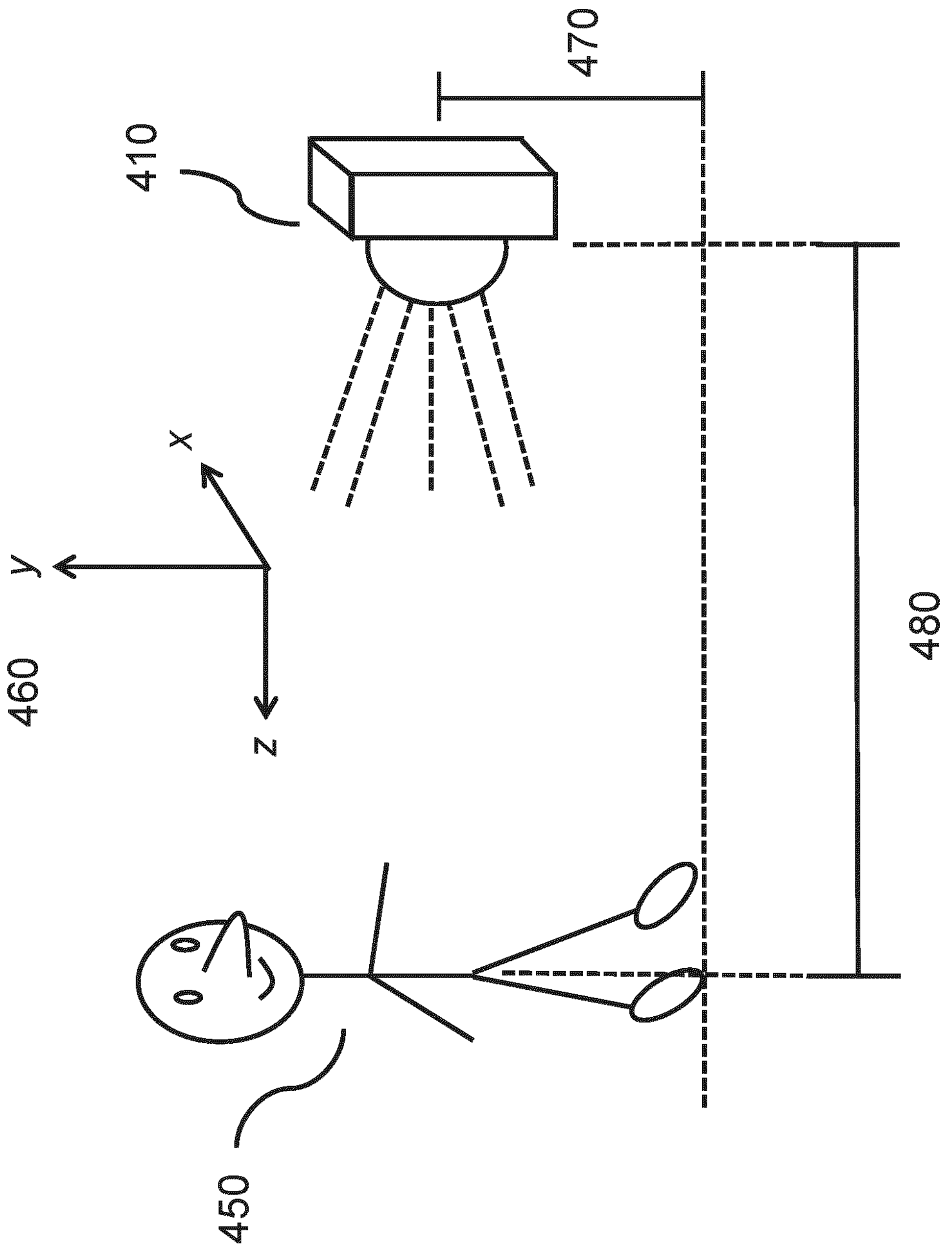
FIG. 4 shows the spatial orientation of a system for system for analyzing and tracking the movement of a subject.

The method continues by tracking in step 120 locations of a plurality of anatomical landmarks of the body based on the depth image data. Anatomical landmarks of a subject are described in more detail below and illustrated in the context of FIG. 4. Determining landmarks from individual images and tracking the same based on a series of images recorded during a predefined time period is typically implemented on computer using a suitable software development kit (SDK). The SDK defines a representation of and individual location in memory. For example, an individual location can be specified as a 3-dimensional coordinate, which includes real- or integer-valued coordinates in x, y, z direction. The coordinate system is also defined by the SDK and has correspondence to the physical environment in which the depth image camera is located and recording. FIG. 4 discussed hereinafter illustrates an example of coordinate system and depth camera. Tracking involves recording of a series of locations for each anatomical landmark over time, for example the predefined time period during which depth image data is recorded.

Figure 3:
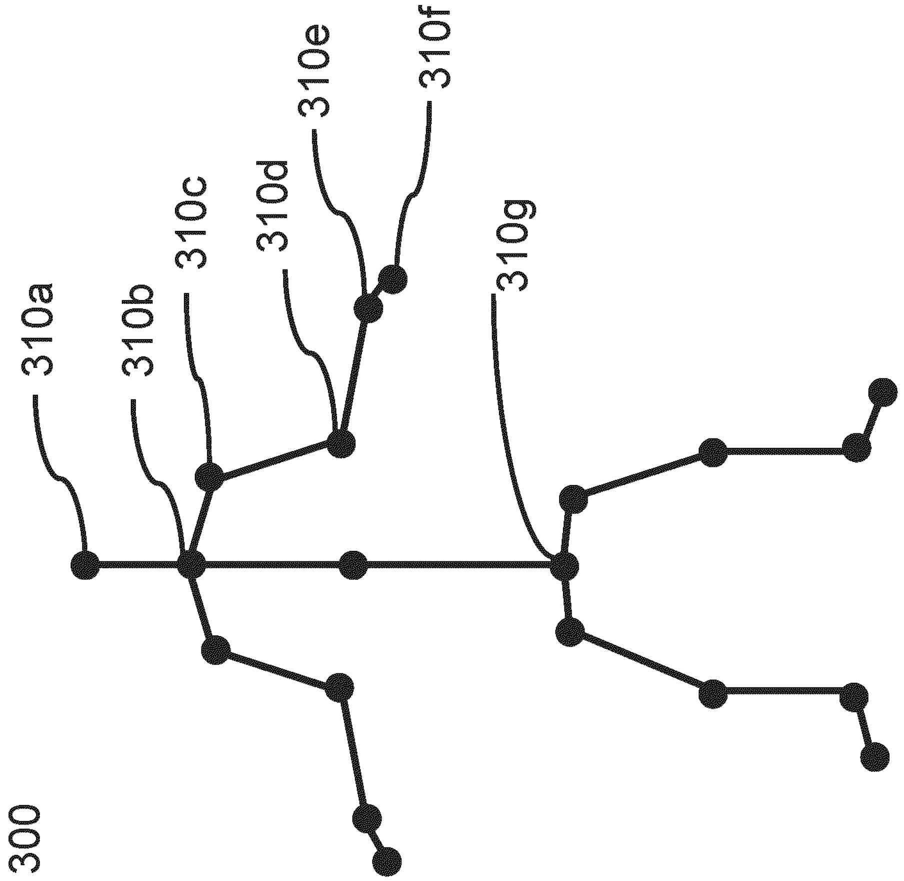
FIG. 3 shows a model of person's skeleton including joints or endpoints.

The analysis of depth data captured during the predefined time period provides motion information for each individual anatomic landmark, and more specifically each skeleton joint, during the predefined time period. For example, using the SDK, information is provided, for each anatomic landmark, about the spatial position of the landmark at each time of a frame capture during the predefined time period. FIG. 3 discussed hereinafter illustrates an example of anatomical landmarks in part corresponding to skeleton joints.

The method continues in step 130 by tracking a location of a predefined point in an environment, in which the person is moving. Naturally, all movements of the person occur in the physically reality which provides a physical environment like the room and surroundings in which the person is exercising and moving. This kind of environment is referred to a "real" or "physical" environment herein. For example, the location of anatomical landmarks of the person are initially determined in the real environment. The term environment as used herein is however not limited to this physical, i.e., real, environment and may also relate to a virtual environment that is superimposed on the real environment, such virtual environment being an augmented reality environment, and more specifically called therapeutic virtual environment (TVE) when used for therapeutic purposes. The predefined point that is tracked in step 130 can, e.g., correspond to an anatomical landmark of the person, which may move over time if the person moves, a static location in the real environment such as a geolocation, which does not move over time, or a current position of some moving object in the real environment.

The predefined point is also referred to as "anchor point" of the virtual environment so that the virtual environment is "anchored" in different ways to the real environment. This is discussed in more detail in the following and illustrated in the accompanying FIGS. 5 to 10. The different ways in which the virtual environment is anchored to the real environment or the subject or object determines how the virtual environment and the position therein move relative to positions in the real environment. For example, in the case where the subject is a person, a virtual environment with which the person is interacting in a therapeutic exercise, may be "anchored" to a position on the person's body, for example an anatomical landmark, where the exercise applies, e.g. the person's shoulder. Such anchoring enables measurement of the movement related to the exercise in the virtual environment occur independently of the precise position of the person in the physical environment, e.g. the absolute position inside a physical room where the person stands when performing the exercise. In another example, the subject can be an object or robot positioned in a physical environment that is unstable, the environment being e.g. a moving carpet, a car, ship, or landslide. Anchoring a virtual environment to a position on or relative to the robot, will enable to assess the motion of the robot, such as a motion caused by some action of the robot, independently of possible jitter or movement of the unstable physical environment.

The method continues with step 140 by adjusting the location of one or more of the plurality of anatomical landmarks 310 relative to the location of the predefined point to obtain adjusted locations. The location of each anatomical landmark is initially determined in the real environment. In some implementations, the adjustment of a coordinate of anatomical landmark means that a difference is computed between the spatial coordinate of the landmark and the spatial coordinate of the anchor point to obtain an adjusted coordinate. In other words, the adjusted coordinate can be understood as a coordinate relative to the anchor point, i.e. a coordinate in a coordinate system with the same orientation in x, y, z direction as an original coordinate system but where the origin is moved to the anchor point. Such adjustment is computed for the position of each landmark and anchor point over the predefined time. The adjustment is intended to determine from the movement of the person in the physical space, movement of the person in the virtual space. As will be discussed in detail in the following, this is advantageous since it enables to track movement of the person in the anchored virtual environment and facilitates to assess movement of the subject's anatomical landmarks relative to each other. For example, if anatomical landmarks intended to be tracked move in the physical environment by the same distance and direction as an anchor point of a virtual environment, then, a zero movement (no movement) is detected based on adjusted coordinates of said anatomical landmarks intended to be tracked and relative to said virtual environment anchored at said anchor point.

The method continues in step 150 by determining a movement of the subject's body based on the adjusted locations during the predefined time period. In that manner and based on the determined movement, feedback can be provided to the person about the movement, such as, e.g., visual guidance of the movement and feedback about a deviation of the movement from a desired movement and the degree of success of some exercise involving the movement. Movement is specified, for example, as a measure of a distance, a curve of movement of an anatomical landmark over time and the length of this curve, an angle, or a ratio. E.g. when a person lifts an arm to the side (coronal move) this could be the increasing distance of the wrist from the hip, or the angle between arm and body or when the arm is moved sagitally, i.e. in the y-z plane of the coordinate system 460 shown in FIG. 4, the ratio between the initial arm length vs its perspective shortening, i.e. wrist-shoulder distance, over time.

Figure 2:
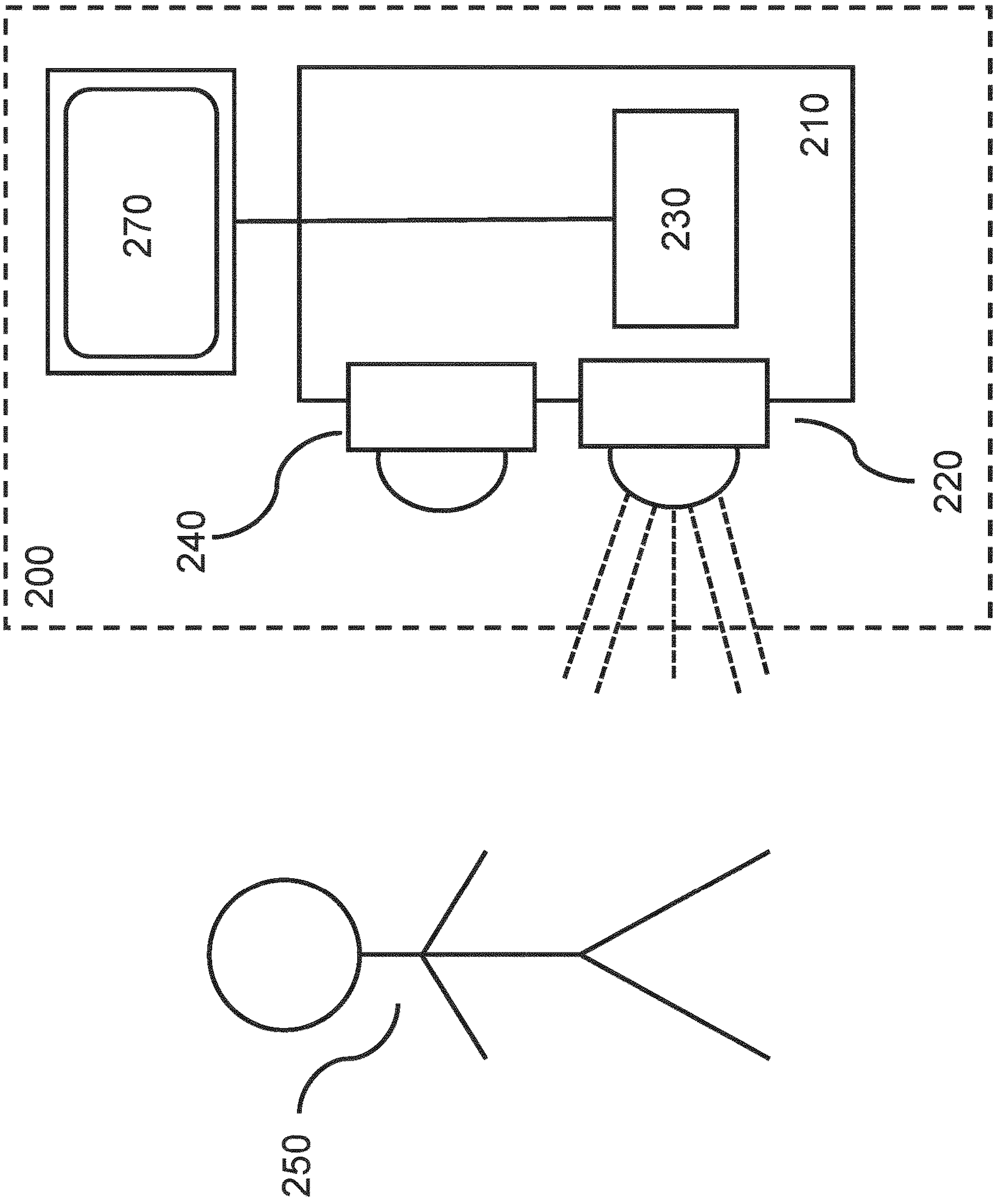
FIG. 2 shows an overview block diagram of a system for analyzing and tracking the movement of a subject.

FIG. 2 shows a system 200 for tracking and analyzing movement of a subject according to the technology disclosed herein. A subject's body 250 is located in the field of view of a motion sensor 220, capable to capture the 3D information.

The motion sensor 220 can be a three-dimensional motion sensor and may include, for example, an infrared depth camera or LiDAR sensor. motion sensors may be combined with a camera 240. Examples of commercial sensors are Microsoft's Kinect™ sensor and Intel RealSense sensor. Other examples include LiDAR-based depth sensors, e.g., available in some of Apple's iPhone™. These and other sensors are marker-fee 3D motion sensors, which means that they do, not require that the person, for which movement is to be determined, is not required to wear body markers, which simplifies the test setup.

The motion sensor 220 is connected to computing device 210 that includes a processor 230, configured to run software, which is typically based on a software development kit, SDK, provided with the motion sensor 220 to obtain and process data from the motion sensor 220. In that manner, the processor 230 is capable to obtain from data corresponding to individual depth images information about the location of anatomic landmarks of the person's body 250. The real time locations of anatomical landmarks can for instance be obtained with the Microsoft Software Development Kit or other software packages based on commercially available depth cameras such as Microsoft Kinect™.

The motion sensor 220 and the computing device 210 may be integrated in a single device or they may be separate devices that are communicatively coupled.

The system may further include a display 270 communicatively coupled to the processor. The display may be included in the computing device as, e.g., is the case with laptop or smartphone, or may be a separate device. The connection between the processor and the display may be via wire as shown in FIG. 2 or wireless.

It is not required to visually perceive the virtual environment, i.e., the augmented reality environment, as a self-cognition. While a VR headset is usable by person as a display 270, even a TV screen can be used for displaying the augmented reality environment to the person. VR headsets are not preferable with older patients.

The computing device 200 may further include a data store, which is not shown in the Figure, to record of motion data obtained over a longer period of time during a plurality of exercises and movement of the same or different persons. Analysis of historical movement data and information derived through further analysis thereof, can, for example, be used to assess progression of movement disorder, the effect of physiotherapy, or other forms of therapy, over time.

In some examples anatomical landmarks can be skeleton joints, also called joints or join points of the person's body, or body points. The kind of landmarks available is typically defined by the SDK provided with the motion sensor 220. For example, the motion sensor 220 in combination with an SDK can provide three-dimensional locations of skeleton joints in real-time. Skeleton joints are discussed in the context of FIG. 3.

FIG. 3 shows a person's skeleton 300. Anatomical landmarks provided by common motion sensor SDKs include two ankles, two knees, two hips, two shoulders, two elbows, two wrists, spine middle, neck, and head. Some of the skeleton joints are indicated in the FIG. 3 as black dots. 310_a_ denotes the tip or center of the head as an endpoint, 310_b_ denotes the neck, 310_c_ denotes a shoulder, 310_d_ denotes an elbow, and 310_e_ denotes a hand wrist, 310_f_ a tip or center of a hand as an endpoint. Landmark 310_g_ denotes the spine base or a hip center 310_g_. Typical frameworks provide at least 20 anatomical landmarks illustrated in FIG. 3. The Figure is only exemplifying the notion of a joint or anatomical landmark and it is further possible, albeit not shown in the FIG. 3, to track, for example, details of a head, ears, eyes, and also fingers and use corresponding position information for motion detection as described herein. Thus, anatomical landmarks are not limited to the ones show in FIG. 3 or those provided by current SDKs. More generally, anatomical landmarks can be joints and other prominent anatomical structures like eyes, ears, fingers, forehead, nose, etc. For instance, rotation without using limbs like rotation of the upper body or for instance rotation of the hand in a stretched arm results rotation data. Two anchor points defined in a geolocation can provide rotation information.

FIG. 4 illustrates details about the spatial information and orientation of the person's body 450 in relation to the motion sensor 410. Spatial coordinates are described by the coordinate system 460, in which the x-axis denotes the horizontal direction, the y-axis denotes the vertical direction, and the z-axis denotes the direction between the position of a person's body 450 and the position of a 3D-motion sensor 410. Spatial information includes information about coordinates in x, y, z direction.

The person's body 450 may be located at a predetermined distance dist to the motion sensor. This distance 480 between the person 450 and the motion sensor 410 can depend on the type and characteristics of the motion sensor 410 and is typically between 0.8 to 4 meters. For a typical scenario, the whole body is in the field of view of the motion sensor 410, which is commonly of about 2.5 to 4 meters away from the motion sensor 410.

The motion sensor 410 is preferably positioned at a predetermined height h. This height 470 above the ground is, for example, around 0.8 meter, which is the typical height when the motion sensor is positioned on a table, or 0.2 to 0.3 meter if the motion sensor or the device including the motion sensor is positioned on the floor.

Figure 9:
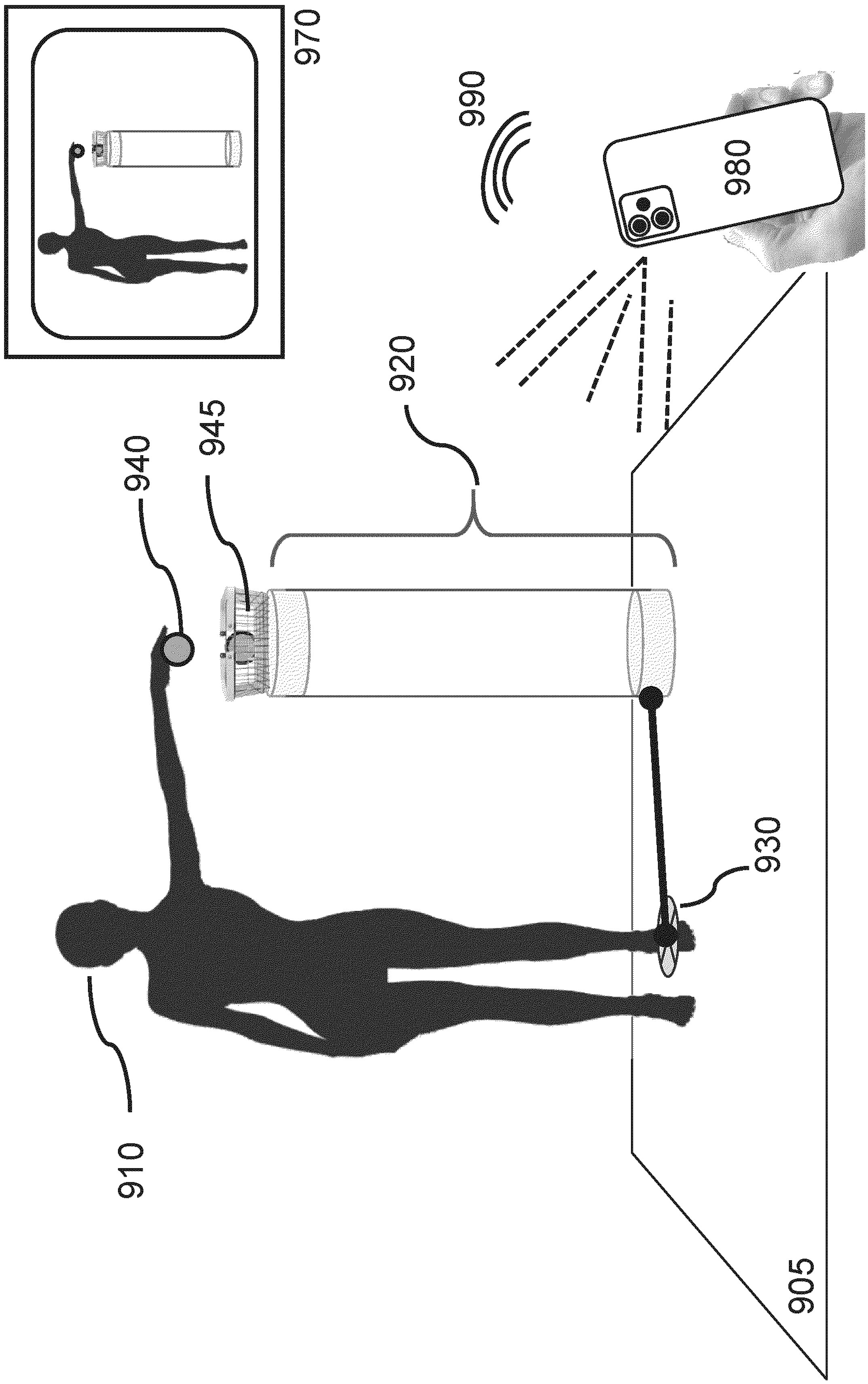
FIG. 9 illustrates a person in an augmented reality environment interacting with a virtual object.

The present technology creates and provides an artificial environment, i.e., the augmented reality environment (ARE), e.g., as a therapeutic virtual environment (TVE). This environment is used to define movements, e.g., stretching a hand outside of a sphere, as shown in the scenario in FIG. 5, or reach out for a virtual wall on the right as shown in the scenario of FIG. 9.

Figure 5:
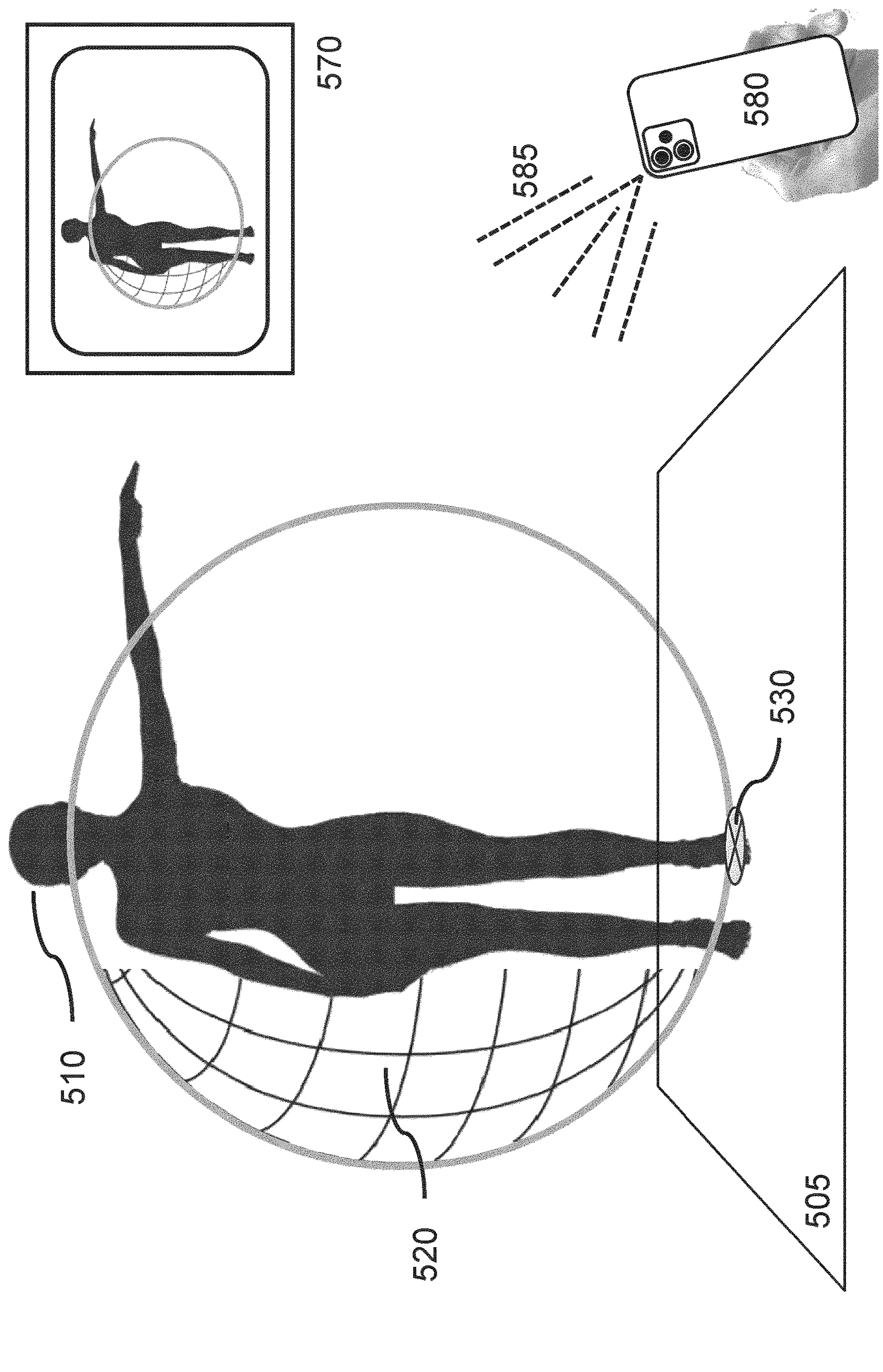
FIG. 5 illustrates a subject and an augmented reality environment, the augmented reality environment being anchored to the subject's body.

One aspect of the disclosed approach is that the TVE is anchored to a spot linked with the patient, such spot being also called anchor point. The patient is typically moving, with movement related to a therapeutic exercise and possibly movement unrelated thereto. The disclosed technology enables to distinguish both kinds of movements and focus assessment of movement on the movement relate to the therapeutic exercise. This approach enables to create a stable and precise patient-TVE system by defined anchor points. These anchor points are one of the following:

(a) a point corresponding to a virtual wire skeleton element, body location, or clothing, e.g., foot ankle, center of body (COB), or shoe; an example is shown in FIG. 5; such anchor point is moving when the subject moves the corresponding body location or clothing;

(b) a point corresponding to a tag attached to the patient or person, e.g., sticker, hook-and-loop tape, or similar; an example is shown in FIG. 5; such anchor point is moving when the tag 530 attached to the patient or person, in this case the person's right foot, moves;

(c) a point corresponding to another reference object, e.g., an edge of a carpet, chair or similar; an example is shown in FIG. 5; in some examples, such anchor point can be a "geolocation", as e.g. known from Apple's Augmented Reality Kit (ARKit), wherein a geolocation identifies the geographic location of a user or computing device via a variety of data collection mechanism, typically including internal GPS devices to determine this location; such anchor point may be fixed to a real environment in which the subject is moving.

In scenarios (a) and (b), the anchor point being part of or directly linked to the patient creates a very stable system between the TVE and the patient.

In scenario (c) the anchor point is not directly linked with the patient and serves as an external reference point to coordinate the relationship between the patient and the TVE.

Accordingly, the augmented reality environment is anchored. Anchoring of the virtual environment is "relative" in that is it is not tied to the subject. It is an anchoring to a stable reference point. This means, that positions in the augmented reality environment are determined relative to a stable position of the anchor. In other words, the augmented reality environment can move in the physical space corresponding to the movement of its anchor. The choice of anchor point may be premised on the ease of its determination or its calculation. Different scenarios and anchors of an augmented reality environment, or more specifically a TVE, are illustrated in FIGS. 5 to 10 described in the following.

FIG. 5 shows an example scenario of a person 510 and a TVE 520. The real environment includes person 510 standing on a floor 505. The TVE 520 includes a virtual object which is illustrated as a globe and is not visible in the real environment.

The device 580 tracks locations of one or more of the plurality of anatomical landmarks of the person's body in the real environment as described before. The TVE 520 is created and maintained as a data structure by software in the device 580. The device maintains the position of virtual object belonging to the TVE 520, which are overlaid on the real environment. In other words, for each object in the TVE 520, the device can compute a position in the real environment and vice versa, i.e., for each anatomical landmarks of the person's body in the real environment, a position in the TVE 520 can be computed.

The device 580 may accordingly compute a visualization of this scenario by overlaying the real environment and the TVE 520 and visualizing the overlay on a display 570 to provide visual feedback to the person 510. In other words, a combined image of the real environment and the superimposed virtual environment is rendered in real-time. The terms "overlaying" and "superimposing" are used interchangeably herein. The rendered combined image can be output for display on a display device 570.

In the following, the terms "right" and "left" should be interpreted as orientation from the perspective of the viewer of FIGS. 5 to 11, which is not necessarily the right or left from the perspective of person shown in FIGS. 5 to 11.

Figure 6:
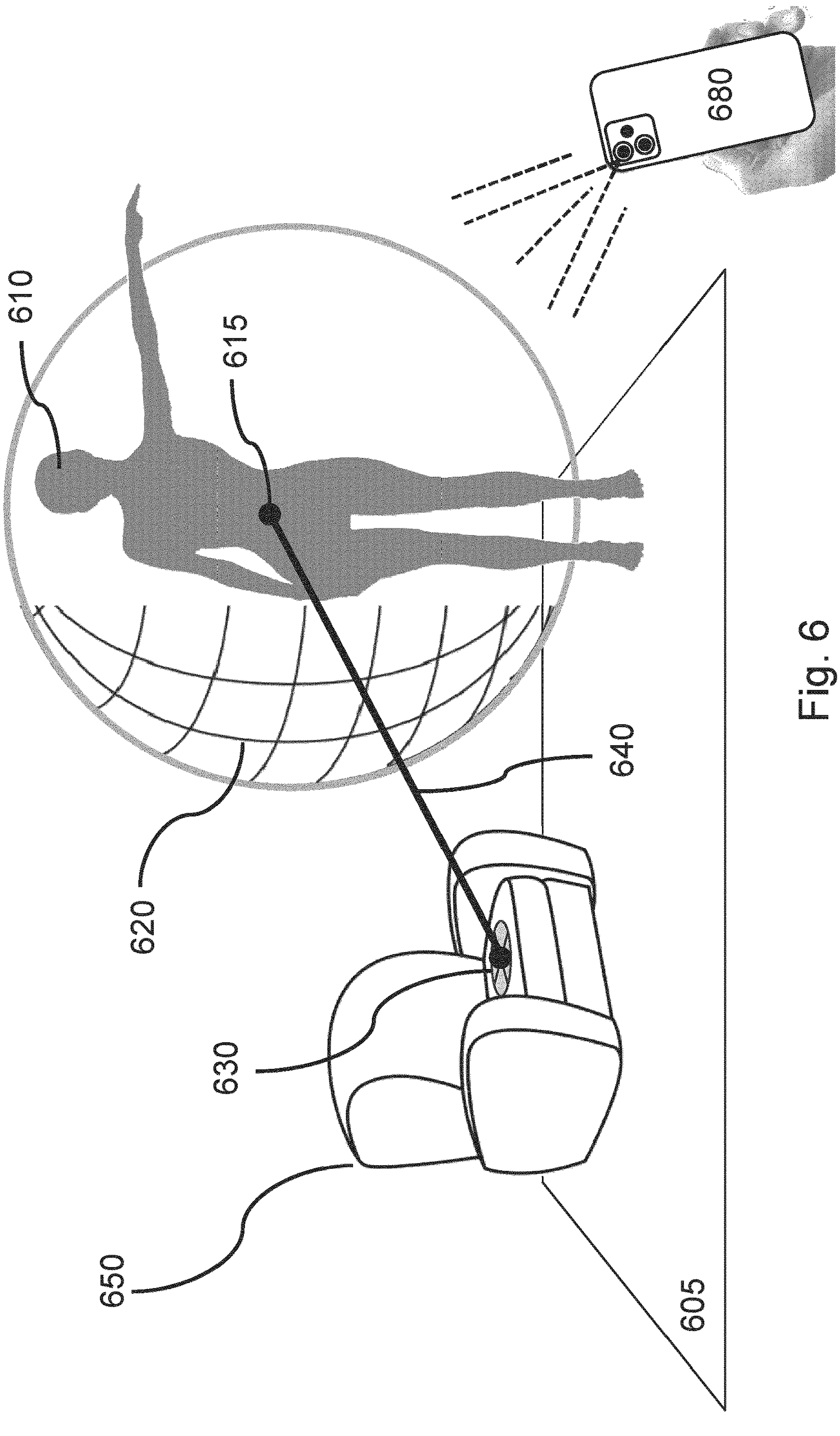
FIG. 6 illustrates a subject and an augmented reality environment, the augmented reality environment being anchored to an anchor point in the real environment.
Figure 11:
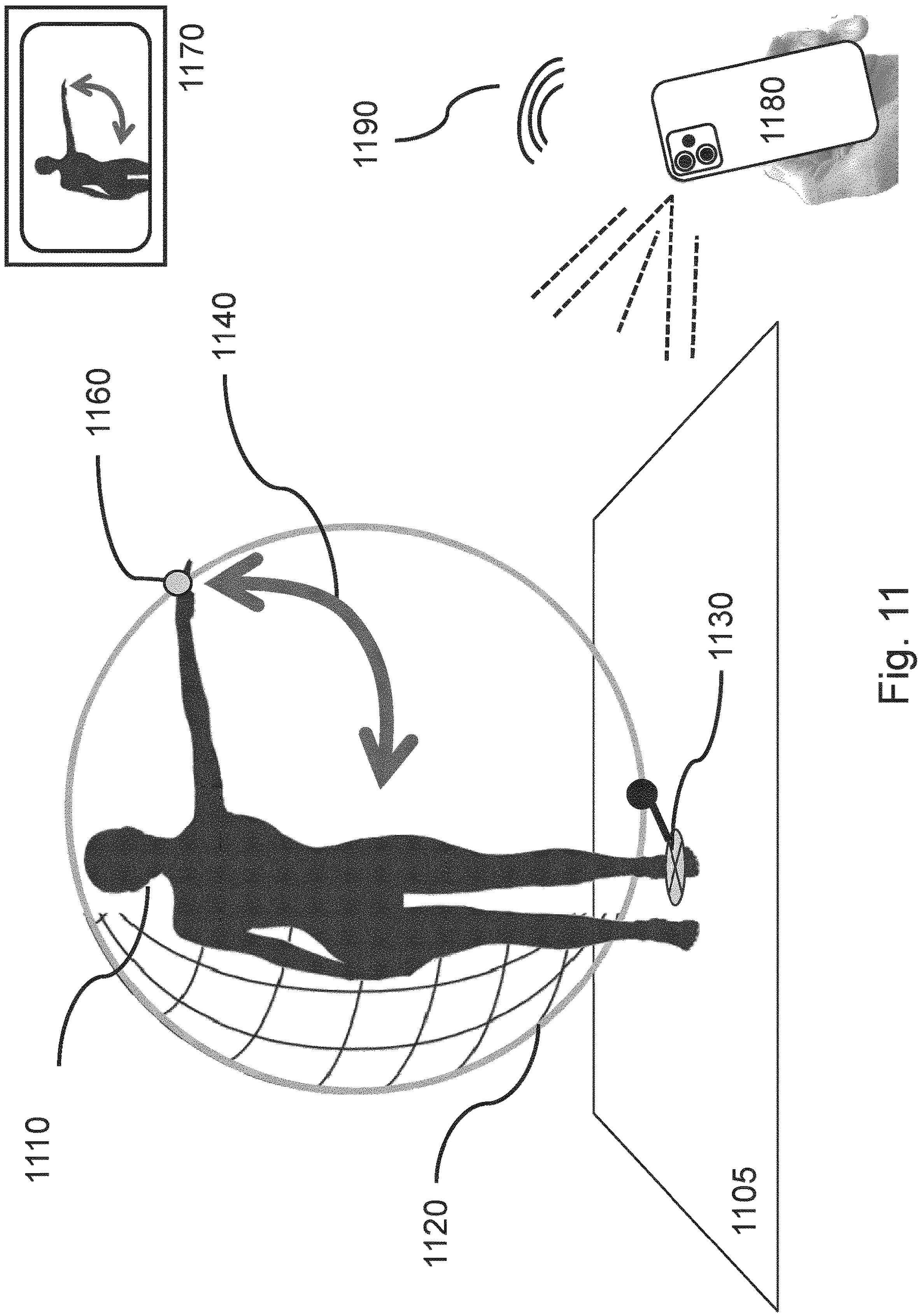
FIG. 11 illustrates a person in an augmented reality environment including a target movement path.

The position of the TVE 520 and, in particular, the virtual environment surrounding the person, which is illustrated in the FIGS. 5, 6, and 11 as a globe, is anchored to the position of the landmark of the right foot or a tag 530 thereon in the FIG. 5.

In this scenario, the TVE 520 is anchored, via optional vector 540, to the position of the right foot of the person 510 in the real environment. In FIG. 5, a tag 530 is shown that is fixed to the foot of the person, so that the illustrated scenario would fall into category (a) mentioned above. The tag 530 is suitable to be recognized in the depth image data. The tag 530, more precisely its position and possible movement, are tracked by the device 580, e.g., using laser, infrared 585 or other depth recognition technologies. While the FIG. 5 shows a tag 530 fixed to the person's body, the tag 530 is optional and a predefined point may also correspond to a position of anatomical landmark of the person's body, such as the right foot or a part thereof, which may be determined and tracked by the device 580 using its depth camera SDK and further software. In the absence of an explicit tag (not shown in FIG. 5), the scenario would fall into category (b) mentioned above. Anchoring means that the globe and the TVE 520 as a whole move by the same offset as the right foot moves in the real environment. I other words, locations in the virtual environment TVE follow a motion of the location of the one of the anatomical landmarks, in the specific scenario the foot of the person.

The effect of this anchoring of the TVE 520 relative to the position of the right foot of the person 510 can be described on an example as follows: In a therapeutic exercise where the person 510 is to move the right arm and reach out far to the right. To support the exercise, the person may be shown the globe of the TVE 520 on a display, so that the person may reach beyond the border of the globe. Since the position of the globe is anchored to the right foot, it will not be possible for the person to step to the right to facilitate reaching out farther beyond the boundary of the globe and thus cheating on the exercise. The position of the right hand of the person is therefore tracked relative to the position of the right foot. This allows to more accurately assess the movement of the person and makes the assessment of the movement of the person and the degree according to which the person meets the goal of reaching beyond the boundary of the virtual globe independent of the absolute position of the person in the real environment.

FIG. 6 illustrates a scenario with a person 610 standing on a floor 605 and a TVE 620 with a static anchor point. In this scenario, the anchor of the TVE 620 is a fixed position in the real environment. The scenario falls into category (c) mentioned above. The anchor point of the TVE 620 is in this case a point of another reference object, in the FIG. 6 shown as a chair 650. More specifically, the chair includes a tag 630 that serves as the anchor point. As in the scenario of FIG. 5, the device 680 maintains the TVE and tracks locations of the plurality of anatomical landmarks of the person's 610 body. In addition, the location of tag 630 suitable to be recognized in the depth image data is tracked and serves to compute the offset according to which the TVE is to be overlaid over the real environment. The TVE is anchored to the tag 630 via a constant offset vector 640. The vector 640 is constant in that it is fixed in length and direction. The vector 640 is optional and may be null. The benefit of anchoring the ARE to the position of a chair or some other static position in the real environment, e.g. a certain position on the floor, is that the person can estimate the position of the virtual environment, illustrated as globe in the Figure, and position herself in a position relative to the physical chair even without a display that shows the overlay of the real and the virtual environment. Another advantage is that a TVE can be set up anywhere, i.e. no specific physical environment is needed.

In some embodiments, the position of a TVE is initially, e.g. at the start of a therapeutic session or exercise, determined to be in alignment with a certain anatomical landmark of the person performing the exercise, for example the center of body (COB) landmark 615. In other words, the virtual environment 620 is positioned such that the COB is located at a specific coordinate in the virtual environment 620, e.g. at the center of the spherical shape 620. In that manner, a constant displacement vector 640 can be determined as a result, for example, relative to a fixed anchor point, i.e. the tag 630 on the chair 650 in the physical environment. This initial determination could be understood as a calibration of the position of the virtual environment. If, during the exercise, it is determined that the position of the COB landmark 615 moves away farther than a threshold distance from the initial position inside the virtual environment 620, then this can be indicated to the person 610 through a visual or acoustic feedback signal. In such situation, the person 610, possibly inadvertently moved away from the initial physical location, which may result in possible degradation of the movement determination through the depth camera, e.g. if the person is out of focus. At that point, the position of the virtual environment may be determined anew, or, alternatively, the person moves back to the initial position, such that the COB landmark of the person is within a threshold distance from the initial position inside the virtual environment. In that manner, the virtual and physical environments can be kept in alignment, thus enabling to keep the TVE system stable.

Figure 7:
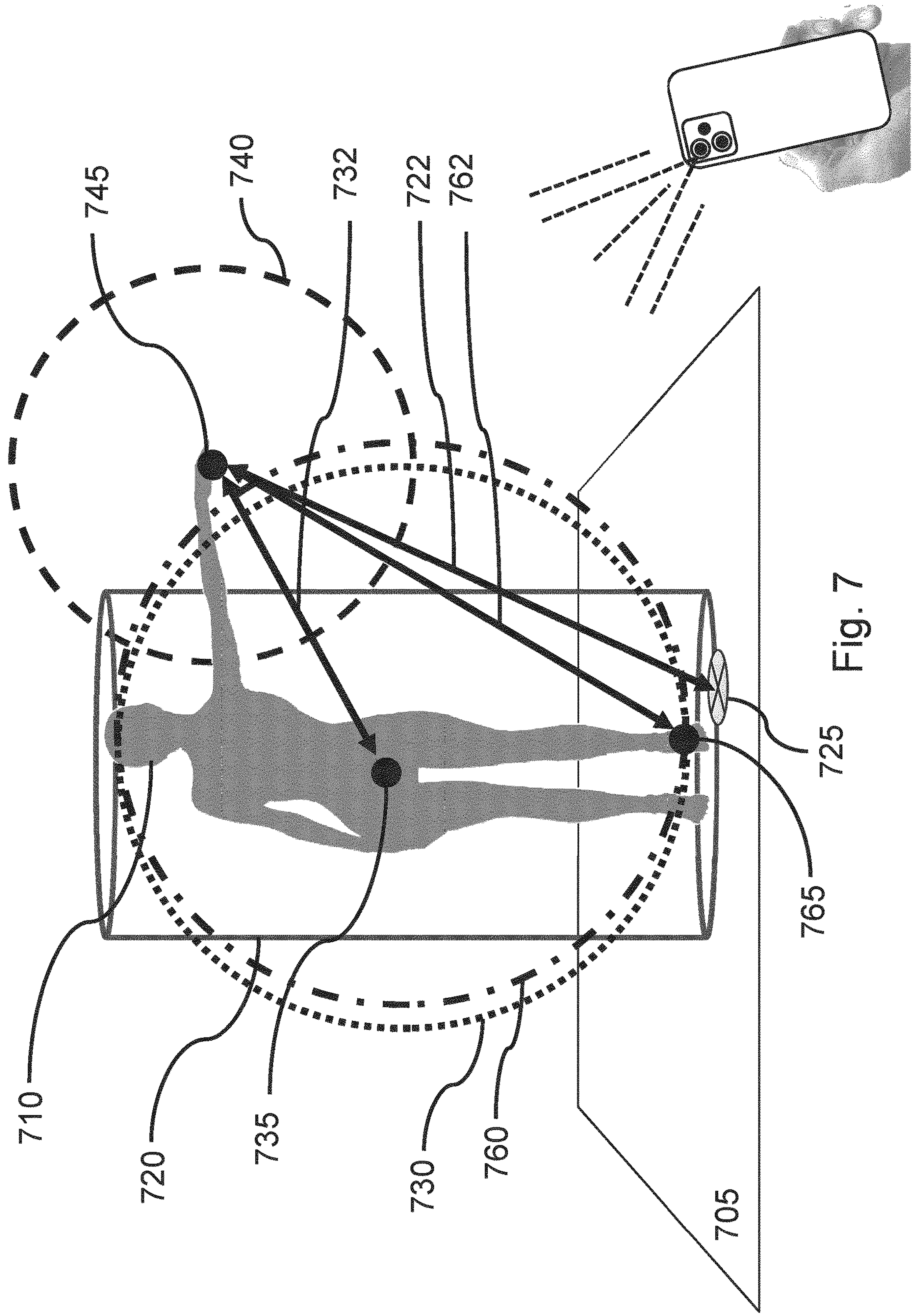
FIG. 7 illustrates a person with multiple augmented reality environments of different shapes.

FIG. 7 illustrates that a therapeutic virtual environment TVE can be of any suitable shape. Simple reference systems like spheres, cylinders, cubes, planes serve as defined spaces of known and adjustable dimensions which are used for measuring distances to anatomical landmarks of the person's body 710.

FIG. 7 shows a person 710 standing on a floor 705 in a real environment. In this case, the ARE includes several virtual objects, also referred to as reference objects, having different shapes. A first reference object 720 having cylindrical shape is anchored using tag 725 to a static position on the floor 705 or a mat on the floor (not shown in FIG. 7). The tag 725 or mat are suitable to be recognized by the computing device and depth image software development kit in the depth image data. The static position 725 could also be a geolocation. A second reference object 730 has a spherical shape and is anchored on the person's anatomical landmark 735 representing the spine base. A third spherical shaped reference object 740 is anchored at the anatomical landmark 745, the anatomical landmark corresponding, e.g. to the tip of the right hand of the person 710. A fourth spherical shaped reference object 760 is anchored at the right foot of the person. As each of the reference objects is anchored to the person's skeleton nodes or to geolocation anchors or tags, they provide precise means for measurements. For example, for a measurement of a distance 732 between the tip of the right hand and the spine base can be done based on the reference object 730. Movement of the tip of the hand relative to the cylindrical reference object can be determined, e.g., as distance 722 between the position of the tip of the right hand and the anchor point 725 of the cylindrical reference object 720. Finally, a distance 762 between the anatomical landmark corresponding to the tip of the hand 745 and the anatomical landmark 765 corresponding to the right foot of the person can be done based on the reference object 760. For example, if the entire person moves physically, distances 732, 762 which are measured relative to reference objects 730 and 760 that are anchored to landmarks of the person's body, will remain unchanged, while a distance 722 measured relative to the reference object 720 anchored to a static position 725 will change.

Figure 8:
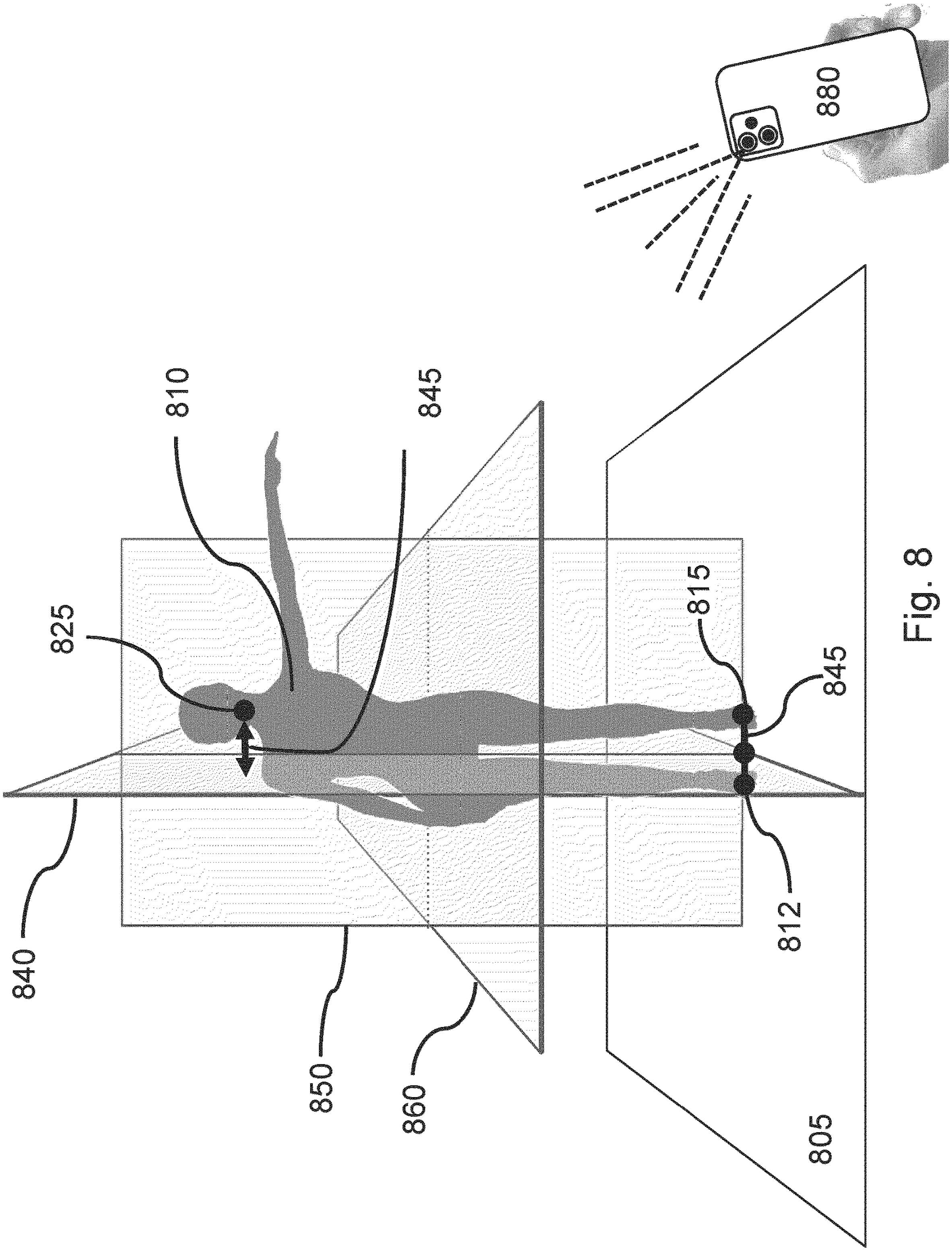
FIG. 8 illustrates a person in an augmented reality environment with a reference object in the shape of three two-dimensional planes.

FIG. 8 shows another embodiment of a therapeutic virtual environment TVE with the reference object having the shape of three two-dimensional planes. The reference object includes a horizontal plane 860, and two vertical planes 850 and 840 orthogonal to each other and orthogonal to the horizontal plane 860. Vertical plane 840 is oriented in sagittal direction towards the person 810, the person standing on a floor 805. In the example, the reference object, i.e., the ensemble of the three planes, is anchored at a spot half way between the landmarks corresponding to the person's tip of the left 812 and right 815 foot. The reference object can be used to determine the position or movement of other anatomical landmarks, for example the person's neck 825, with respect to the reference object. FIG. 8 shows, for example the distance 845 between the person's neck 825 and the vertical plane 840. The reference object may be visualized and shown to the person through a computer screen communicatively coupled to the device 880. Such display is optional and not shown in the FIG. 8.

FIG. 9 shows another scenario of a person 910 standing on a floor 905. In this case, the TVE includes a virtual pillar 920 and virtual basket 945. The TVE including the basket and the pillar is anchored at the foot of the person, in the Figure shown as a tag 930 fixed to the foot of the person 910. Device 980 tracks positions of plurality of anatomical landmarks of the person's 910 body, creates and maintains the TVE, and communicates 990 an overlay image to a display 970. The person may use this display as a guidance to interact with the virtual objects, namely with the pillar 920 and basket 945. The therapeutic exercise may be that the person puts a ball 940 into the basket 945 ("gamification").

In one case, the ball 940 may be a virtual object, anchored to an anatomical landmark corresponding to the right hand of the person. The pillar 920 is a reference object in the TVE anchored to the right foot. Making a step toward the pillar will therefore move the pillar and basket in a manner that maintains the distance between the right foot and the virtual pillar and the basked and will therefore not help the person to reach the basket. Moving only the right arm farther to the basket will not move the pillar and basket and will allow the person to succeed in depositing the virtual ball into the virtual basket 945. The determination of the position of the virtual ball 940 relative to the virtual basket 945 is done by the device 980 and the augmented relativity software running thereon.

More generally, the augmented reality environment, i.e., the TVE 920, includes one or more virtual objects 920 and 945 that a subject 910 can interact with. The device 980 determines in the augmented reality environment and based on the adjusted locations and a location of the one or more virtual objects 920 and 945, whether the subject 910 interacts with the virtual objects ad in response to determining an interaction, an indication of the interaction is signaled to the subject, e.g., via a display 970 or an audible indication 990.

In another case the ball may also be a real object in the real environment that is designed to be tracked by the device 980. For example, such a physical ball can include a tag, not shown in FIG. 9, that allows very precise identification and tracking by the motion sensor and the augmented reality software included in device 980.

Figure 10:
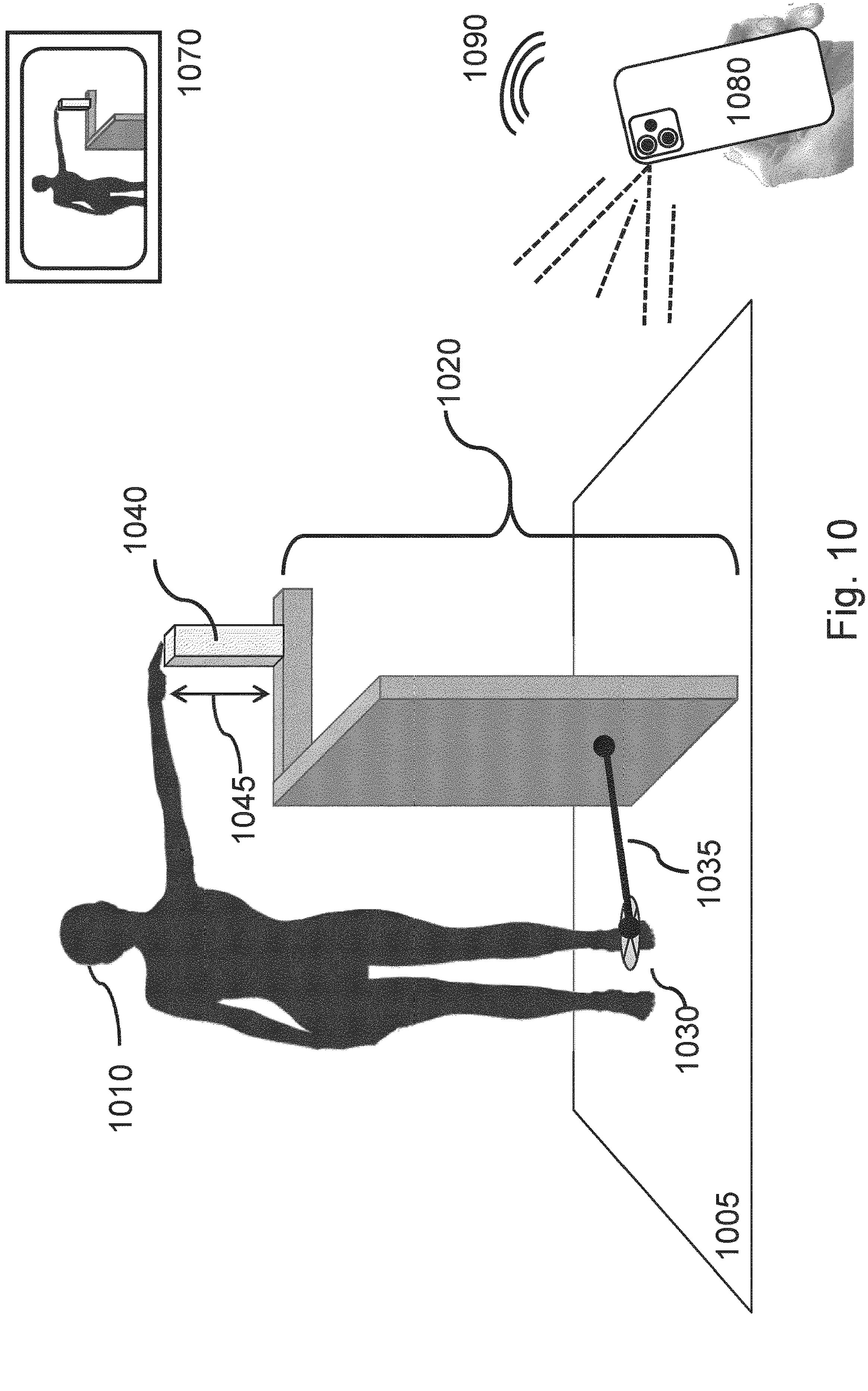
FIG. 10 illustrates a person in an augmented reality environment including a virtual guiding object.

FIG. 10 shows a person 1010 standing on a floor 1005 in a real environment. FIG. 10 further shows a TVE including a virtual wall 1020 and a guiding object 1040. The virtual guiding object 1040 that has dimensions 1045 suitable to achieve a desired therapeutic effect and can vary depending on the person 1010, e.g. her size, and her therapeutic needs. Similar to the scenario in FIG. 9. the virtual wall is anchored to a position 1030 of the right foot of the person. This means that the distance 1035 between the person's right foot and the virtual wall remains constant. In that manner, the virtual wall 1020 and the virtual guiding object 1040 will move together with the movement of the person's right foot. In other words, the subject's 1010 relation to the guiding object, i.e., the virtual wall 1020, is basically static, e.g., 1 m distance between the person and the wall. In such cases with the movement of the subject 1010 the guiding object 1020 moves respecting that relation.

Device 1080 tracks positions of plurality of anatomical landmarks of the person's body 1010, creates and maintains the TVE, and, e.g., wirelessly 1090, communicates an image of the person and an overlay image including the virtual wall 1020 and guiding object 1040 to a display 1070. The person may use this display 1070 as a guidance to interact with the virtual guiding object 1040.

FIG. 11 illustrates a scenario of person 1110 standing on a floor 1105 in a real environment. The scenario further shows a TVE, including a spherical reference object 1120, illustrated as a globe, and a target movement path 1140. Similar to the scenarios in FIGS. 9 and 10, the TVE is anchored to a position of the right foot of the person, namely at a tag 1130 fixed to the person's foot. The tag is optional, and the anchor could also correspond to the position of a tracked anatomical landmark of the person. Device 1180 tracks positions of plurality of anatomical landmarks of the person's body 1110, creates and maintains the TVE, and communicates an overlay image to a display 1170. In the overlay, the position of virtual objects 1120 and 1140 included in the TVE is computed based on the position of the anchor of the TVE, which is position of the tag 1130 on the right foot of the person's body 1110. The person may use this display 1170, and in particular the distance between the position of the hand 1160 recorded in an image recorded by a camera in device 1180 and shown on the display 1170 and the position of the intended movement path 1140 included in the TVE and also shown as an overlay on the display 1170. A significant deviation of the position of the hand and the intended movement path can be expressly signaled visually on the display 1170 or audibly via sound 1190.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. In the foregoing description, the provision of the examples described, as well as clauses phrased as "such as," "including" and the like, should not be interpreted as limiting embodiments to the specific examples; rather, the examples are intended to illustrate only one of many possible embodiments.

Further embodiments are described in the following:

Embodiment 1: A computer-implemented method 100 for movement tracking of a subject, the method comprising the steps of: obtaining 110 depth image data of a subject's body 250 during a predefined time period; tracking 120 locations of a plurality of anatomical landmarks 310 of the body based on the depth image data; tracking 130 a location of a predefined point in an environment, in which the subject is moving; adjusting 140 the location of one or more of the plurality of anatomical landmarks 310 relative to the location of the predefined point to obtain adjusted locations; determining 150 a movement of the subject's body based on the adjusted locations during the predefined time period.

Embodiment 2: The method 100 of embodiment 1, wherein the environment is a real environment, wherein the predefined point is an anchor point of a virtual environment superimposed on the real environment, and wherein the adjusted locations correspond to a position of the subject's body in the virtual environment.

Embodiment 3: The method 100 of embodiment 2, wherein the predefined point 530 corresponds to one of the anatomical landmarks or a tag 530 attached to the subject's body and suitable to be recognized in the depth image data, so that locations in the virtual environment 520 follow a motion of the location of the one of the anatomical landmarks.

Embodiment 4. The method 100 of embodiment 2, wherein the predefined point is a fixed location in the real environment, the fixed location being preferably one of a geolocation or a position of a tag 630 fixed to the real environment and suitable to be recognized in the depth image data.

Embodiment 5: The method 100 of one of embodiment 2 to 4, wherein the virtual environment is an augmented reality environment.

Embodiment 6: The method 100 of embodiment 5, wherein the augmented reality environment includes a virtual object 920 that the subject 910 can interact with; and the method further comprises the steps of: determining, in the augmented reality environment and based on the adjusted locations and a location of the virtual object 920, whether the subject 910 interacts with the virtual object 920; and in response to determining an interaction, signaling an indication 990 of the interaction to the subject (910).

Embodiment 7: The method 100 of embodiment 5 or 6, wherein the augmented reality environment includes a virtual guiding object 1020 and the method further comprises the steps of: determining, in the augmented reality environment and based on the adjusted locations and a location of the virtual guiding object 1020, a virtual distance between a subject's body part corresponding to one or more of the adjusted locations and the virtual guiding object 1020; in response to the determination, signaling an indication 1090 of the virtual distance 1045 to the subject 1010.

Embodiment 8: The method 100 of one of embodiment 5 to 7, wherein the augmented reality environment 1120 includes a virtual target movement path 1140 and the method further comprises the steps of: determining, during the predefined time period and based on the adjusted locations and locations of the target movement path 1140, a deviation of the subject's body part corresponding to one or more of the adjusted locations 1160 and the target movement path 1130; in response to the determination, signaling an indication 1190 of the deviation to the subject 1110.

Embodiment 9: The method 100 of one of embodiment 2 to 8 further comprising the steps: rendering in real-time a combined image of the real environment and the superimposed virtual environment; outputting the combined image for display.

Embodiment 10: The method 100 of one of the preceding embodiments, wherein depth image data is obtained using a LIDAR sensor, and wherein the LiDAR sensor is optionally included in a mobile computing device.

Embodiment 11: A computing device 210, comprising: a motion sensor 220; a camera 240; and a processor 230 communicatively coupled to a display 270 and adapted to perform the steps according to the method of one of embodiments 1 to 9.

Embodiment 12: The computing device 210 of embodiment 10, wherein the motion sensor 220 is a LIDAR sensor.

Embodiment 13: The computing device 210 of embodiment 10 or 11, wherein the computing device 210 is a mobile computing device.

Embodiment 14: A computer-readable medium comprising instructions which, when executed by a computer, cause the computer to carry out the method for movement tracking of a subject according to the method of one of embodiments 1 to 10.

Embodiment 15: The method 100 of embodiment 5 or 6, wherein the augmented reality environment includes a virtual reference object having the shape of three two-dimensional planes. The reference object includes a horizontal plane 860, and two vertical planes 850 and 840 orthogonal to each other and orthogonal to the horizontal plane 860. Vertical plane 840 is oriented in sagittal direction towards the person 810.

Embodiment 16: The method 100 of embodiment 15, wherein the reference object, i.e., the ensemble of the three planes, is anchored at a spot half way between the landmarks corresponding to the person's tip of the left 812 and right 815 foot.

Embodiment 17: The method 100 of embodiment 5 or 6, wherein an initial position of the augmented reality environment, e.g. at the start of a therapeutic session or exercise, is determined to be in alignment with a certain anatomical landmark of a subject performing the exercise and wherein the method further includes the steps of: determining a constant displacement vector 640 relative to a fixed anchor point, i.e. the tag 630 on the chair 650 in the physical environment; determining that the position of the certain anatomical landmark 615 moves away farther than a threshold distance from the initial position inside the virtual environment 620; optionally issuing to the person 610 a visual or acoustic feedback signal; determining a new position of the augmented reality environment, wherein the position for the augmented reality environment is determined by defining an anchor point and optionally a displacement vector.

The invention claimed is:

1. A computer-implemented method for movement tracking of a subject, the method comprising:

obtaining depth image data of a subject's body during a predefined time period;

tracking locations of a plurality of anatomical landmarks of the body based on the depth image data;

tracking a location of a predefined point in an environment, in which the subject is moving, wherein the environment is a real environment, wherein the predefined point is an anchor point of a virtual environment superimposed on the real environment, and wherein the virtual environment is an augmented reality environment that includes a virtual object that the subject can interact with;

adjusting the location of one or more of the plurality of anatomical landmarks relative to the location of the predefined point to obtain adjusted locations, wherein the adjusted locations correspond to a position of the subject's body in the virtual environment;

determining a movement of the subject's body based on the adjusted locations during the predefined time period;

determining, in the augmented reality environment and based on the adjusted locations and a location of the virtual object, whether the subject interacts with the virtual object; and in response to determining an interaction, signaling an indication of the interaction to the subject.

2. The method of claim 1, wherein the predefined point corresponds to one of the anatomical landmarks or a tag attached to the subject's body and suitable to be recognized in the depth image data, so that locations in the virtual environment follow a motion of the location of the one of the anatomical landmarks.

3. The method of claim 1, wherein the predefined point is a fixed location in the real environment, the fixed location being one of a geolocation or a position of a tag fixed to the real environment and suitable to be recognized in the depth image data.

4. The method of claim 1, wherein the augmented reality environment includes a virtual guiding object, the method further comprising:

determining, in the augmented reality environment and based on the adjusted locations and a location of the virtual guiding object, a virtual distance between a body part of the subject corresponding to one or more of the adjusted locations and the virtual guiding object; and in response to the determination, signaling an indication of the virtual distance to the subject.

5. The method of claim 1, wherein the augmented reality environment includes a virtual target movement path, the method further comprising:

determining, during the predefined time period and based on the adjusted locations and locations of the virtual target movement path, a deviation of a body part of the subject corresponding to one or more of the adjusted locations and the virtual target movement path; and in response to the determination, signaling an indication of the deviation to the subject.

6. The method of claim 1, further comprising:

rendering in real-time a combined image of the real environment and the superimposed virtual environment; and outputting the combined image for display.

7. The method of claim 1, wherein depth image data is obtained using a light detection and radar (LiDAR) sensor, and wherein the LiDAR sensor is included in a mobile computing device.

8. A computing device, comprising:

a motion sensor;

a camera;

a memory; and a processor communicatively coupled to the motion sensor, the camera, and the memory, the processor configured to execute instructions stored on the memory, wherein the instructions cause the processor to perform or control performance of operations comprising:

obtaining, via the motion sensor or the camera, depth image data of a subject's body during a predefined time period;

tracking locations of a plurality of anatomical landmarks of the body based on the depth image data;

tracking a location of a predefined point in an environment, in which the subject is moving, wherein the environment is a real environment, wherein the predefined point is an anchor point of a virtual environment superimposed on the real environment, and wherein the virtual environment is an augmented reality environment that includes a virtual object that the subject can interact with;

adjusting the location of one or more of the plurality of anatomical landmarks relative to the location of the predefined point to obtain adjusted locations, wherein the adjusted locations correspond to a position of the subject's body in the virtual environment;

determining a movement of the subject's body based on the adjusted locations during the predefined time period;

determining, in the augmented reality environment and based on the adjusted locations and a location of the virtual object, whether the subject interacts with the virtual object; and in response to determining an interaction, signaling an indication of the interaction to the subject.

9. The computing device of claim 8, wherein the motion sensor is a light detection and radar (LiDAR) sensor.

10. The computing device of claim 8, wherein the computing device is a mobile computing device.

11. A non-transitory computer-readable medium with instructions stored thereon that, when executed by a processor, cause the processor to perform or control performance of operations comprising:

obtaining depth image data of a subject's body during a predefined time period;

tracking locations of a plurality of anatomical landmarks of the body based on the depth image data;

tracking a location of a predefined point in an environment, in which the subject is moving, wherein the environment is a real environment, wherein the predefined point is an anchor point of a virtual environment superimposed on the real environment, and wherein the virtual environment is an augmented reality environment that includes a virtual object that the subject can interact with;

adjusting the location of one or more of the plurality of anatomical landmarks relative to the location of the predefined point to obtain adjusted locations, wherein the adjusted locations correspond to a position of the subject's body in the virtual environment;

determining a movement of the subject's body based on the adjusted locations during the predefined time period;

determining, in the augmented reality environment and based on the adjusted locations and a location of the virtual object, whether the subject interacts with the virtual object; and in response to determining an interaction, signaling an indication of the interaction to the subject.

12. The non-transitory computer-readable medium of claim 11, wherein the predefined point corresponds to one of the anatomical landmarks or a tag attached to the subject's body and suitable to be recognized in the depth image data, so that locations in the virtual environment follow a motion of the location of the one of the anatomical landmarks.

13. The non-transitory computer-readable medium of claim 11, wherein the predefined point is a fixed location in the real environment, the fixed location being one of a geolocation or a position of a tag fixed to the real environment and suitable to be recognized in the depth image data.

14. The non-transitory computer-readable medium of claim 11, wherein the augmented reality environment includes a virtual guiding object, and wherein the instructions cause the processor to perform or control performance of further operations comprising:

determining, in the augmented reality environment and based on the adjusted locations and a location of the virtual guiding object, a virtual distance between a subject's body part corresponding to one or more of the adjusted locations and the virtual guiding object; and in response to the determination, signaling an indication of the virtual distance to the subject.

* * * * *